US011975340B2

(12) United States Patent
Kadic et al.

(10) Patent No.: US 11,975,340 B2
(45) Date of Patent: May 7, 2024

(54) DEVICE FOR DIELECTROPHORETIC CAPTURE OF PARTICLES

(71) Applicant: Robert Bosch GmbH, Stuttgart (DE)

(72) Inventors: Samir Kadic, Langenau (DE); Christoph Faigle, Wolfratshausen (DE)

(73) Assignee: Robert Bosch GmbH, Stuttgart (DE)

( * ) Notice: Subject to any disclaimer, the term of this patent is extended or adjusted under 35 U.S.C. 154(b) by 696 days.

(21) Appl. No.: 17/255,547

(22) PCT Filed: Jun. 27, 2019

(86) PCT No.: PCT/EP2019/067150
§ 371 (c)(1),
(2) Date: Dec. 23, 2020

(87) PCT Pub. No.: WO2020/007703
PCT Pub. Date: Jan. 9, 2020

(65) Prior Publication Data
US 2021/0260602 A1 Aug. 26, 2021

(30) Foreign Application Priority Data
Jul. 4, 2018 (DE) ..................... 10 2018 211 001.8

(51) Int. Cl.
*B03C 5/00* (2006.01)
*B01L 3/00* (2006.01)

(52) U.S. Cl.
CPC ........ *B03C 5/005* (2013.01); *B01L 3/502707* (2013.01); *B01L 2300/0645* (2013.01); *B01L 2400/0424* (2013.01)

(58) Field of Classification Search
CPC ......... B03C 5/005; B03C 5/026; B03C 5/028; B01L 2300/0645; B01L 2400/0424
See application file for complete search history.

(56) References Cited

U.S. PATENT DOCUMENTS 6,375,899 B1 4/2002 Ackley et al.
6,727,451 B1 * 4/2004 Fuhr ...................... B03C 5/026 204/519
(Continued)

FOREIGN PATENT DOCUMENTS

CA 2265597 A1 * 3/1998 ............... B03C 5/02
CN 1990093 A 7/2007
(Continued)

OTHER PUBLICATIONS

EPO machine-generated English language translation of WO 2014/199889 A1, patent published Dec. 18, 2014 (Year: 2014).*
(Continued)

*Primary Examiner* — Alexander S Noguerola
(74) *Attorney, Agent, or Firm* — Maginot, Moore & Beck LLP

(57) ABSTRACT

The disclosure relates to a device for dielectrophoretic capture of particles. The device includes at least one electrical contact and at least one layer. The at least one layer includes a top layer side, a bottom layer side, and a barrier structure. The barrier structure is configured such that a fluid comprising the particles can flow through the barrier structure which is disposed on the top layer side. The barrier structure spaces the top layer side apart from the bottom layer side of at least one of the same layer and a second of the at least one layer.

13 Claims, 6 Drawing Sheets

(56) References Cited

U.S. PATENT DOCUMENTS

| | | | |
|---|---|---|---|
| 2003/0168339 A1 | 9/2003 | Audeh | |
| 2004/0175708 A1 | 9/2004 | Caillat et al. | |
| 2007/0152206 A1* | 7/2007 | Cho | B03C 5/005 257/10 |
| 2007/0187248 A1 | 8/2007 | Hodko et al. | |
| 2008/0289966 A1 | 11/2008 | Voldman et al. | |
| 2012/0085649 A1 | 4/2012 | Sano et al. | |
| 2015/0041325 A1* | 2/2015 | Chiou | G01N 27/44778 204/643 |
| 2015/0152556 A1 | 6/2015 | Brcka et al. | |
| 2017/0106083 A1 | 4/2017 | Birmingham | |

FOREIGN PATENT DOCUMENTS

| | | | | |
|---|---|---|---|---|
| CN | 101046458 A | 10/2007 | | |
| CN | 104048906 A | 9/2014 | | |
| CN | 104165079 A | 11/2014 | | |
| CN | 104174492 A | 12/2014 | | |
| DE | 41 27 405 A1 | 2/1993 | | |
| TW | 200811438 A | 3/2008 | | |
| TW | 200919129 A | 5/2009 | | |
| TW | 201417889 A | 5/2014 | | |
| TW | 201502516 A | 1/2015 | | |
| WO | WO 03001193 A1 * | 1/2003 | | G01N 27/27 |
| WO | 2009/027927 A2 | 3/2009 | | |
| WO | 2014/199889 A1 | 12/2014 | | |

OTHER PUBLICATIONS

English language translation of the Written Opinion for international application No. PCT/EP2019/067150; dated Jul. 4, 2018 (Year: 2018).*

International Search Report corresponding to PCT Application No. PCT/EP2019/067150, dated Sep. 5, 2019 (German and English language document) (8 pages).

* cited by examiner

DEVICE FOR DIELECTROPHORETIC CAPTURE OF PARTICLES

This application is a 35 U.S.C. § 371 National Stage Application of PCT/EP2019/067150, filed on Jun. 27, 2019, which claims the benefit of priority to Serial No. DE 10 2018 211 001.8, filed on Jul. 4, 2018 in Germany, the disclosures of which are incorporated herein by reference in their entirety.

The invention disclosure relates to an apparatus for dielectrophoretic trapping of particles, and to a process for producing a corresponding apparatus.

STATE OF THE ART

Circulating tumor cells (CTCs) and cell-free tumor DNA (circulating tumor DNA, ctDNA) have become established in the past few years as promising biomarkers of absolute clinical relevance for diagnosis and adapted therapy of malignant tumors and metastases. Early and reliable detection thereof in the human body, in particular from blood or other suitable body fluids, has therefore long been one of the main focuses of research in modern oncology (liquid biopsy).

This form of tumor analysis offers significant advantages, especially to the patient, over conventional invasive tissue biopsies. Not least the integration of emerging analysis techniques in highly developed microscale systems and the combination of all processing steps required to form a chain in a single compact device (lab-on-a-chip) make this analysis approach seem very attractive on account of its potentially very short processing time, high precision, reproducibility, flexibility, simplicity and very low cost.

In this connection, the urgent need for reliable isolation of tumor material with regard to these requirements has been manifested to date in a great multitude of different approaches.

As well as simple mechanical filtering, the methods used in the past have included hydrodynamic variants or antibody-based methods for separation of circulating tumor cells in microfluidic channels on the basis of corresponding physical properties such as size, density or deformability. However, crucial limitations have been observed here in each case; practicable use was frustrated to a very substantial degree.

SUMMARY

What is proposed here, according to the disclosure, is an apparatus for dielectrophoretic trapping of particles, at least comprising one or more layers and electrical contacts, wherein the layers each have a top layer side, a bottom layer side and a barrier structure. A fluid comprising the particles can flow through the barrier structure. Moreover, the barrier structure is disposed on the top layer side, wherein the barrier structure spaces the top layer side apart from the bottom layer side of the same layer or of one of the further layers.

The solution proposed here is especially based on the approach of manipulating particles according to their dielectric properties. This approach has the particular advantages that it is scalable independently of markers and on a large scale, and can be used in a simple, contactless and versatile manner, and has very good integratability into modern MEMS and microfluidic technologies. A particularly preferred constituent of the solution proposed here is the superposed layering of a layer capable of trapping by DEP force, especially a film structure, to form a multilayer overall trapping system. The at least one layer is also referred to hereinafter as "DEP strip".

The apparatus serves for, and is set up for, (controlled) dielectrophoretic trapping of (particular) particles. In other words, what this means is more particularly that the apparatus serves for, or is set up for, controlled dielectrophoretic trapping of particles of a particular type or kind (target cells). The solution presented here advantageously enables trapping of at least one particular type of particles from a medium guided within the channel, and hence makes them removable or makes it possible to remove them.

The type of particle or kind of particle (target particle/target cell) is especially determined by its dielectric properties. By way of example, tumor cells circulating in the blood (advantageous target cells) differ in their electrical permittivity from normal white blood cells. The particles to be trapped are especially circulating tumor cells.

Each cell typically has its own unique morphology. This is a function of factors including the cell type, the complexity of the inner life of the cell, and the phase in the cell cycle. The cell membrane of most cell types, moreover, is not smooth but is actually punctuated by creases and microvilli.

Unlike healthy blood cells, tumor cells form a solid tissue from which individual circulating tumor cells (CTCs) can become detached in the course of tumor growth. The actual cell membrane surface thereof, on account of the elevated packing density in the original tissue, is therefore greater compared to that of the healthy blood cells freely present in the blood, and increases with increasing disorder as a result of the advancing growth of the tumor.

Together with cell size, the cell membrane area is the morphological property manifested in different crossover frequencies of the two cell types: in a study of frequency behavior of more than 80 different solid tumor types, it was found that a greater normalized surface capacity by between 50% and 300% compared to healthy blood cells and a larger cell radius on average for tumor cells lead to crossover frequencies between 20 kHz and 75 kHz. Given the same conductivity of 0.03 S/m, crossover frequencies were more than 120 kHz for all the 15 subpopulations of healthy mononuclear blood cells examined. For five types of leukemia cells, crossover frequencies were between 60 kHz and 100 kHz.

Based on these findings and the fact that the crossover frequencies of the most plentiful subpopulations of healthy blood cells—namely the lymphocytes and granulocytes—have very small standard deviations and are at least 5 to 7 standard deviations removed from the crossover frequencies of most tumor types, dielectrophoresis is suitable for reliable isolation of all types of solid tumors and—albeit with lower efficiencies—applicable to (highly concentrated) leukemia populations.

The DEP sorting of CTCs from healthy blood cells is based (in this connection) especially on opposing movement of the two particle types: especially when the operating frequency is between the respective crossover frequencies, tumor cells can be attracted by pDEP and healthy blood cells repelled by nDEP. The barrier structure and/or the electrical contacts is/are especially set up such that corresponding operating frequencies can be established here.

Dielectrophoretic trapping is based on the mechanism of dielectrophoresis (DEP). This refers to the movement of (even uncharged) polarizable particles in a nonhomogeneous electrical field. A dipole induced in the particle as a result of an electrical alternating field applied from the outside interacts here with that same external field and leads to a dielectrophoretic force acting on the particle. This force can be utilized here for retention of the particle and hence for dielectrophoretic trapping thereof.

The two different architectures or principles of particle trapping that may exist here, mDEP and iDEP, are elucidated hereinafter.

Principle of iDEP: in this variant, electrical field lines are generated with a low-frequency DC signal or AC signal (there may even be overlap of two different signal components), and curved at insulating (barrier) structures (polymers, glass, etc.) within the fluid channel. The greatest curvature takes place in the region of the constriction where particles can be trapped by pDEP. In iDEP applications, a DC voltage can frequently also serve for flow of the fluid by electroosmosis.

Principle of mDEP: the generation of the field is generally accomplished here by the direct application of an electrical voltage to barrier structures (electrode structures), especially metal (barrier) structures (usually to an alternating microelectrode arrangement). The greatest field gradient generally occurs at the edges of the electrodes.

The apparatus further comprises one or more layers. The apparatus preferably comprises exactly or only one layer, for example when the layer is coiled, for example to form a coiled cylinder. Alternatively, the apparatus may have a multitude of layers, for example when the layers are stacked one on top of another to form a stack.

The layers preferably each comprise at least one (electrically insulating) insulator stratum or insulation stratum. What this means more particularly is that the layers may each comprise at least one (two-dimensional) stratum set up to be electrically insulating. This insulator stratum may be formed, for example, by a film. The (insulator) films may, for example, be (thin, spin-coated) polyimide films, especially having a thickness of, for example, up to 25 μm. More preferably, the layers each comprise at least two (two-dimensional) insulator strata arranged one on top of another, which may enclose an electrode (which is two-dimensional and/or in a meandering arrangement) between them.

The apparatus further comprises electrical contacts. The electrical contacts are especially set up to form an electrical field within the fluid channel and especially in the region of the barrier structures. The electrical contacts are generally connectable or connected to a power supply.

For iDEP applications, the contacts may have, for example, two contact arms that extend at least partly along one of the layers, opposite one another. Contact arms that are (directly) opposite one another especially have (only) partial overlap. The contact arms preferably extend here across the top layer side and/or in the region of the barrier structure (in the form of an insulator structure for iDEP applications). Further preferably, contact arms may be formed both on the top layer side and on the bottom layer side. The contact arms are preferably formed with (flat) conductor tracks that have especially been applied to the top layer side and/or bottom layer side. It is possible here for one of the contact arms to form a plus pole and the other contact arm a minus pole. It is thus possible to establish an electrical field, especially an inhomogeneous electrical field, between the contact arms, the field lines of which can be curved or deflected by the barrier structure (insulator structure).

For mDEP applications, the contacts may be set up, for example, to connect the electrodes of the barrier structure formed as the electrode structure and/or the electrode that extends along (and/or within) the layer to a power supply. In this case too, the contacts may have contact arms which connect, for example, some of the electrodes of the electrode structure to a plus pole and other electrodes of the electrode structure to a minus pole. It is thus possible to establish an electrical field, especially an inhomogeneous electrical field, between the electrodes of the electrode structure. In addition, the contacts may connect the electrode that extends along and/or within the layer, for example, to a plus pole or minus pole.

The layers each have a top layer side and a bottom layer side. The layers are preferably each in two-dimensional form. In general, these each have a two-dimensional top layer side and a two-dimensional bottom layer side. When multiple layers are provided, these are preferably identical. The layers may each be formed by multiple strata that are arranged one on top of another and/or two-dimensional.

In addition, the layers each have a barrier structure. A fluid comprising the particles can flow through the barrier structure. The fluid is generally blood. Moreover, the barrier structure is disposed on the top layer side. In addition, it may also be the case that a barrier structure is disposed on the top layer side and a barrier structure on the bottom layer side. The barrier structure is set up to space apart the top layer side from the bottom layer side of the same layer (for example when just one layer is present, which is coiled to form a cylinder) or one of the further layers (for example when multiple layers are provided, which are stacked to form a stack).

The barrier structures especially extend along at least one (longitudinal) section of the layer and/or (in an uncoiled state of the layer) in a plane. Preferably, at least one of the barrier structures has a multitude of posts (which are electrically insulating and/or electrically insulated or take the form of rod electrodes). More preferably, each barrier structure has a multitude of posts. A barrier structure may extend, for example, along a longitudinal section of the layer in that multiple posts of the barrier structure are arranged alongside one another in the longitudinal direction of the layer (which may relate to an uncoiling direction of the layer). Furthermore, multiple posts of the barrier structure may be arranged in succession (transverse to the longitudinal direction).

Preferably, the barrier structures are each set up in such a way that they contribute to establishment of a (particular, especially predefined) spatial inhomogeneity of an electrical field. The electrical field here is especially formed within the fluid channel and especially in the region of the barrier structures (possibly even by the barrier structures (in the case of mDEP)). More preferably, the barrier structures (especially in interaction with the electrical contacts) are each set up to form particle type-specific energy minima in the fluid channel. The meaning of the term "energy minima" is elucidated in detail further down. This advantageously permits trapping (only) of particular particles or particles of a particular type in the fluid channel. In this connection, it is further preferable when the barrier structures are dimensioned in a particle-type specific manner. What this means more particularly, in other words, is that the barrier structures are dimensioned in accordance with the type of particles (target cell) to be trapped.

What is proposed in a preferred configuration is that at least one of the layers is coiled. In this connection, it is preferable when just one layer is provided. This layer is further preferably coiled to form a coiled cylinder. More preferably, the layer is coiled in a spiral. In this connection, it is especially preferable when the layer is coiled in such a way that a (microfluidic) fluid channel in which the barrier structure is disposed is formed between the top layer side and the bottom layer side of the same layer.

What is proposed in a preferred configuration is that two or more of the layers are stacked. What this means more particularly, in other words, is that at least two of the layers are provided and stacked to form a stack. These layers each have a barrier structure. In addition, it is also possible to provide at least one (smooth) layer in the stack which does not have a barrier structure, for example as an interlayer or outer layer. In this connection, it is especially preferable when two or more of the layers are stacked in such a way that a (microfluidic) fluid channel in which one of the barrier structures is disposed is formed between the top layer side of one of the layers and the bottom layer side of an adjacent layer.

What is proposed in a preferred configuration is that the barrier structure is an insulator structure. What this means more particularly, in other words, is that the barrier structures are formed by or from an electrically insulating material. Such barrier structures are used especially in the implementation of an iDEP system (insulator-based dielectrophoresis, iDEP). The insulating material especially projects here into the channel in the manner of posts, and in some cases even spans at least part of a channel cross section.

What is proposed in a preferred configuration is that the barrier structure is an electrode structure. What this means more particularly, in other words, is that the barrier structures are formed by or from an electrically conductive material. Such barrier structures are especially used in the implementation of an mDEP system (metal-based dielectrophoresis, mDEP). The electrically conductive material here especially projects into the channel in the manner of posts, and in some cases even spans at least part of a channel cross section. In this connection, it is further preferable when the electrode structures are each formed by a multitude of microelectrodes. The electrode structures are preferably electrically contacted in such a way that the barrier structures (each) comprise both cathodes and anodes. More preferably, at least one of the barrier structures comprises the same number of cathodes as anodes.

In mDEP systems, it would be possible to structure the (micro)electrodes (needed for the purpose) directly on the top layer side, for example by lithography methods. More particularly, thermally vapor-deposited or electroplated metal, for instance gold or copper, is suitable for the purpose. In the case of iDEP applications, the insulator barrier structures or insulator structures (required for the purpose) could consist of the same material as the layer as well, especially an insulator stratum of the layer itself, and/or likewise be structured by lithography (optionally together with the layer).

In a preferred configuration, the apparatus further comprises at least one electrical passivation or electrical insulation. The layer preferably comprises an electrical passivation, especially over the whole area, preferably on the top layer side. The electrical passivation may also serve here to cover at least a part of the surface of the barrier structure disposed on the layer. The electrical passivation may be formed, for example, with a material which is chemically inert but electrically very substantially transparent. The electrical insulation may be formed, for example, by one or more insulator strata of a layer.

In a preferred configuration, the apparatus further comprises at least one electrode extending at least partly along (and/or within) one of the layers. The electrode here preferably extends within the (two-dimensional) material of the layer, which can be implemented, for example, in that the electrode extends between two layers, especially films, arranged one on top of the other. The layer here is preferably formed by a sandwich arrangement of two insulator strata and a metal electrode embedded therein over the whole area. What this means more particularly, in other words, is that an insulator stratum is provided as the upper stratum and an insulator stratum as the lower stratum, which enclose the metal electrode between them.

In a further aspect, a process for producing an apparatus proposed here is also proposed, at least comprising provision of one or more of the layers and coiling of at least one of the layers or stacking two or more of the layers.

The details, features and advantageous configurations discussed in connection with the apparatus can correspondingly also occur in the process presented here, and vice versa. In this respect, reference is made in full to the details given therein for more specific characterization of the features.

BRIEF DESCRIPTION OF THE DRAWINGS

The solution presented here and the technical field thereof are elucidated in detail hereinafter with reference to the figures. It should be pointed out that the working examples shown are not intended to restrict the disclosure. More particularly, unless explicitly stated otherwise, it is also possible to extract some aspects of the matter elucidated in the figures and combine them with other constituents and/or findings from other figures and/or the present description. The figures show, in schematic form.

DETAILED DESCRIPTION

Figure 1:
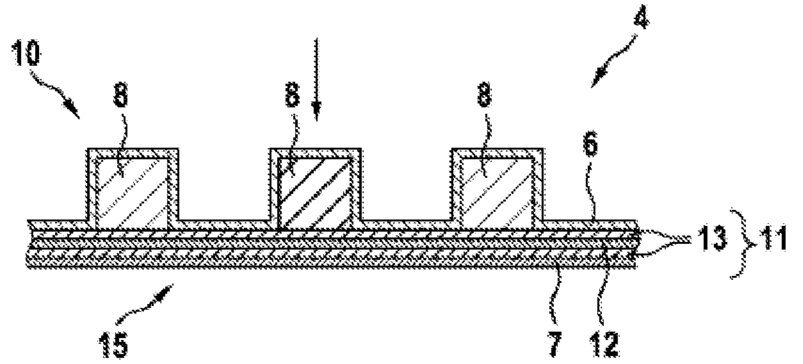
FIG. 1: a layer of an apparatus proposed here in a section view.

With regard to the technical field of the solution presented here, which also relates to an apparatus for dielectrophoretic trapping of particles, the following may be stated:

The underlying mechanism, called dielectrophoresis (DEP), refers to the movement of (even uncharged) polarizable particles in a nonhomogeneous electrical field. A dipole induced in the particle as a result of an electrical alternating field applied from the outside interacts here with that same external field and leads to a dielectrophoretic force acting on the particle.

If only the first-order dipole moment is taken into account, and all other higher-order terms and the force acting on charged particles in the form of the coulombic term (electrophoresis) are neglected, the time-averaged dielectrophoretic force on a particle can be formulated in the most general case for a spatially stationary electrical field as $$\langle \vec{F}_{DEP} \rangle = \Gamma \cdot \varepsilon_m \cdot \mathrm{Re}(\tilde{f}_{CM}) \cdot \vec{\nabla} |\vec{E}_{RMS}|^2$$

Γ here denotes the geometry factor of the particle, $\varepsilon_m$ the (absolute) real electrical permittivity of the surrounding medium, $\vec{E}_{RMS}$ the effective value of the electrical field vector applied (root mean square, RMS), and $\mathrm{Re}(\tilde{f}_{CM})$ the real part of the "Claudius-Mosotti factor" (CM factor).

In the simplest case of a spherical particle, representative of a tumor cell by way of example, given that $$\tilde{f}_{CM} = \frac{\tilde{\varepsilon}_p - \tilde{\varepsilon}_m}{\tilde{\varepsilon}_p + 2\tilde{\varepsilon}_m}$$

and $$\Gamma = 2\pi R^3$$

this expression can be rewritten as $$\langle \vec{F}_{DEP} \rangle = 2\pi\varepsilon_m \cdot \mathrm{Re}(\tilde{f}_{CM}) \cdot R^3 \cdot \vec{\nabla} |\vec{E}_{RMS}|^2$$

R here represents the radius of the cell in question, and $\tilde{\varepsilon}_p$ and $\tilde{\varepsilon}_m$ represent the (absolute) complex electrical permittivity of particle and surrounding medium, where, moreover, $$\tilde{\varepsilon} = \varepsilon - j\frac{\sigma}{\omega}$$

with $j=\sqrt{-1}$ as the complex unit, σ as the electrical conductivity, and ω as the angular frequency of the electrical field applied.

According to the sign of $\mathrm{Re}(\tilde{f}_{CM})$ (depending on the operating point of the electrical field and the relative match between frequency-dependent (absolute) real electrical permittivity ε and electrical conductivity σ between medium and material), for manipulation, either an attractive (positive dielectrophoresis, pDEP) or repulsive (negative dielectrophoresis, nDEP) force may be caused to act on particles.

This is of interest particularly when, for example by virtue of external limitations such as undefined flow conditions in microfluidic channels or lack of space in the DEP system, no continuous separation (equilibrium approaches) is achieved in a flowing field, and instead all that can be monitored is the trapping (inequilibrium approaches) of target particles therein either by metal electrodes (mDEP) or insulating posts (iDEP). The latter approach is based on the fundamental principle that particles to be isolated by pDEP are addressed and held by electrodes, in the face of the flow forces of the flowing medium, whereas unwanted particles are simultaneously repelled by nDEP.

For the mode of function of DEP manipulation, in particular in the design of the concept, the last factor $\nabla = |\vec{E}_{RMS}|^2$ in particular in the above expression for $(\vec{F}_{DEP})$ is of significance, which occurs independently of the material, shape and size of the target particle. As well as the amplitude and the distribution of the electrical field in time, it expresses the spatial inhomogeneity thereof. This spatial inhomogeneity may be generated in a microfluidic channel, for example, via suitable structuring of microelectrodes in the channel and direct application of a corresponding electrical signal thereto (metal-based dielectrophoresis, mDEP), or (alternatively) via appropriately designed insulator structures in the channel and an externally applied electrical field (insulator-based dielectrophoresis, iDEP). In the case of mDEP, deformation of the electrical field to the approximately planar electrode edges would be observed, and, in the case of iDEP, around the insulating extruded structures as a result of deformation.

If the DEP system is not (or not only) designed for continuous separation in a flowing fluid but (as here) for trapping of target particles (assuming that the operating point via the electrical field is more particularly set in such a way that a sufficiently high pDEP can act on all target particles), both variants especially have the aim of using appropriate dimensions of $\vec{\nabla} = |\vec{E}_{RMS}|^2$ to configure the spatial energy landscape for particles in such a way that energy minima caused (energy minimum for particles, since pDEP) retain only target particles in the face of any other energies that exist in the system within the scope of fixed boundary conditions (throughput, destruction of the cell, recovery and purity rates of the separation, etc.), while all other species that occur in the medium remain very substantially unaffected by this action (force acting through DEP either positive and very small or even negative).

The meaning of the term "energy minima" is elucidated in detail hereinafter: in the case of pDEP (attractive force), particles are generally moved in the direction of the maxima of the electrical field strength. But these regions correspond to minima in an energy landscape, called "potential wells". Another way in which this can be described is that, in the case of pDEP, the particles move in the direction of higher field strength, but fall into a "potential well" or into "potential wells". "Energy minima" are understood here more particularly to mean the minima described in the energy landscape, or the potential wells described. What this means more particularly, in other words, is that the energy minima are minima in the energy landscape and/or potential wells.

The (above-described) principle of particle trapping by means of pDEP is an attractive manipulation approach which is preferably pursued in the context of the solution presented here.

In conventional implementations of mDEP or iDEP trapping separators, it was possible to observe the following: On account of the generally very small range of the dielectrophoretic force, in particle trapping, however, maximum distances between the electrodes and the particles should generally be observed between the electrodes and the particles (up to 100 μm), but this can conversely result in limited channel dimensions, at least in vertical direction, and hence comparatively low throughputs. These can be increased only to a limited degree by increasing the flow rate, since the resulting flow forces should never be dominant over the dielectrophoretic forces (in the pN range) or damage the cells (corresponds as an equivalent to maximum flow rates in conventional DEP systems up to about 100 μm/s). The result would be that the particles trapped would be rinsed away immediately, and a severe drop in separation efficiency would be expected.

Alternatively, it would be possible to increase the cross section and hence the throughput in conventional designs also by significantly broadening the channel in horizontal direction, but the extent of such a channel here too is highly limited by the typically limited size of the DEP system.

Against this background, a brief calculation example is to be presented hereinafter for a conventional DEP trapping filtration (which is compared further down with a calculation example for an embodiment of the solution presented here):

If it were necessary, for liquid biopsy applications, for example, to process a blood sample of size 10 ml within one hour in a channel of height 50 μm at a fluid velocity of 100 μm/s, it would be necessary to accept an effective channel width of more than 55 cm (the cross-sectional area for flow without barriers is then about 28 $mm^2$), but this would be much too unwieldy from a microfluidic point of view.

Proceeding from this, it is a particular aim of the disclosure to redistribute a channel which is forced to be very flat and broad by the small range of the dielectrophoretic force, which would conventionally take up too great a footprint for filter operation in the form of dielectrophoretic particle trapping at sufficiently high throughput, to a volume that can be managed with maximum efficiency. In this case, for example, the extent of a quasi-planar DEP structure may be extended by a third spatial dimension in such a way that compression to a maximum cross-sectional flow area can be provided. The arrangement is especially capable of giving the target cells a minimum interaction distance (high gradients of the electrical field or high DEP forces), but a sufficiently long interaction distance with the DEP electrodes, coupled with otherwise advantageous low flow rates, but advantageously sufficiently high throughput.

FIG. 1 shows a schematic of a layer 4 for an apparatus proposed here in a section view. The layer 4 has a top layer side 6, a bottom layer side 7 and a barrier structure 8. A fluid comprising the particles 2, 3 (not shown here) can flow through the barrier structure 8. In addition, the barrier structure 8 is disposed on the top layer side 6.

In the execution variant according to FIG. 1, the layer 4, by way of example, is formed in the manner of a DEP film. The layer 4 here is formed by a sandwich arrangement composed of two insulator strata 13 and a metal electrode 12 embedded therein over the whole area. The insulator strata 13 constitute an example of how a layer 4 can have an electrical insulation 11. The counterelectrodes form extruded metal posts that are applied to one of the two insulator strata 13 and are connected to one another at the base by flat conductor tracks 14 (not shown here; cf. FIG. 3) (an exchange of polarities takes place, for example, in the chessboard pattern between the posts). The extruded metal posts constitute an example of how the barrier structure 8 can be executed as electrode structure.

Furthermore, the layer 4 in the diagram according to FIG. 1, by way of example, has electrical passivation 10 over the whole area of the strip. This electrical passivation 10 may be formed, for example, by a chemically inert material of, however, maximum electrical transparency. In addition, the layer 4 in FIG. 1, by way of example, has a thin adhesive stratum 15 on the reverse side of the strip or on the bottom layer side 7. This adhesive stratum 15 could ensure ultimate strength in the case of stacking, and integrity of the microchannels in later operation.

Figure 2:
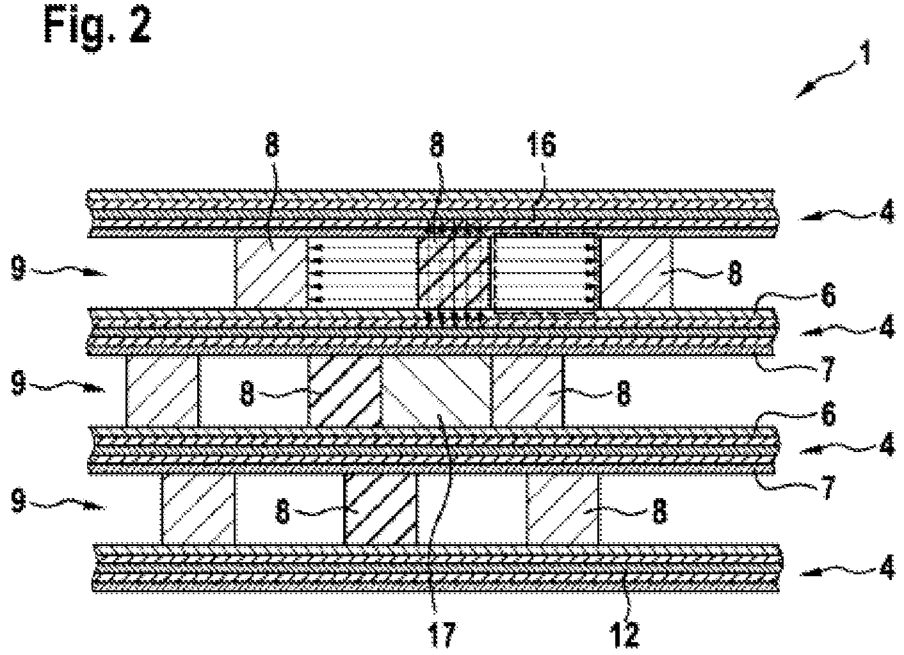
FIG. 2: an apparatus proposed here in a section view.

FIG. 2 shows a schematic of an apparatus 1 proposed here in a section view. The reference numerals are used uniformly, and so reference may be made in full to the above details relating to FIG. 1.

The apparatus 1 is set up for dielectrophoretic trapping of particles 2, 3 (not shown here). The apparatus 1 comprises one or more layers 4 and electrical contacts 5 (not shown here). The layers 4 each have a top layer side 6, a bottom layer side 7, and a barrier structure 8. A fluid comprising the particles 2, 3 (not shown here) can flow through the barrier structure 8. The barrier structure 8 is disposed on the top layer side 6. In addition, the barrier structure 8 spaces the top layer side 6 apart from the bottom layer side 7 of the same layer 4 or one of the further layers 4.

The arrangement according to FIG. 2 may be formed, for example, by stacking multiple layers 4 according to FIG. 1 or alternatively by coiling a layer 4 according to FIG. 1. In this connection, the arrangement may be similar to a coplanar conduit. The effective cross-sectional area of a theoretical microfluidic channel can be defined via the distances and heights of the individual posts. Once rolled up, the barrier structure 8 or the stratum having the metal posts is surrounded on both sides, insulated by two layers 4 of a planar electrode 12, and hence fully shielded from adjacent barrier structures 8 or (barrier structure) strata—winding or stacking is thus enabled in a particularly advantageous manner. This is especially manifested in a symmetrical and uniform electrical field 16 that can be discovered in each of the “cages” (component microfluidic channels 17).

However, if crosstalk between two layers 4 of the DEP strip were negligible in operation, it would also be possible to omit the shielding for simplified production and operation. All that could remain by way of example could be just one insulator stratum 13 to which the metal posts (barrier structure 8) together with conductor tracks 14 (not shown here; cf. FIG. 3) and contacts 5 (not shown here; cf. FIG. 3) could be applied.

In all cases, it would be possible for incoming particles (target cells) to pass through the stacked barrier structures 8 and advantageously to interact as strongly as possible with the inhomogeneous electrical field 16. The summation of many theoretical small component microfluidic channels 17 across the width of an overall strip, in the stacked state, results in a parallel connection to form a channel having acceptable effective cross-sectional area.

It is also apparent in FIG. 2 that a fluid channel 9 with the barrier structure 8 disposed therein has been formed between the top layer side 6 of a bottom layer side 7 facing it. The sum total of these fluid channels 9 or of the component microfluidic channels 17 results in a (total) flow cross-sectional area of the apparatus, which has also been referred to as effective cross-sectional area above.

Figure 3:
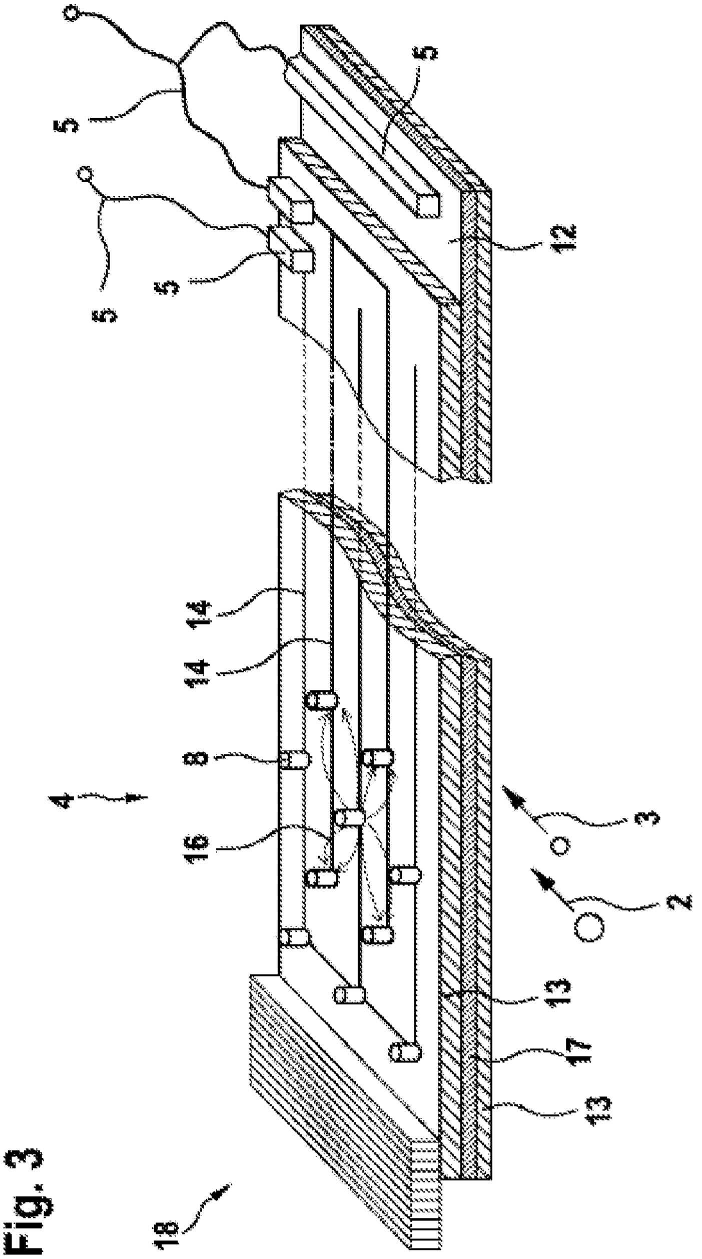
FIG. 3: a layer according to FIG. 1 or from FIG. 2 in a perspective view.

FIG. 3 shows, in schematic form, a layer 4 according to FIG. 1 or from FIG. 2 in a perspective view. The reference numerals are used uniformly, and so reference may be made in full to the above remarks relating to the previous FIGS. 1 and 2.

Figure 4:
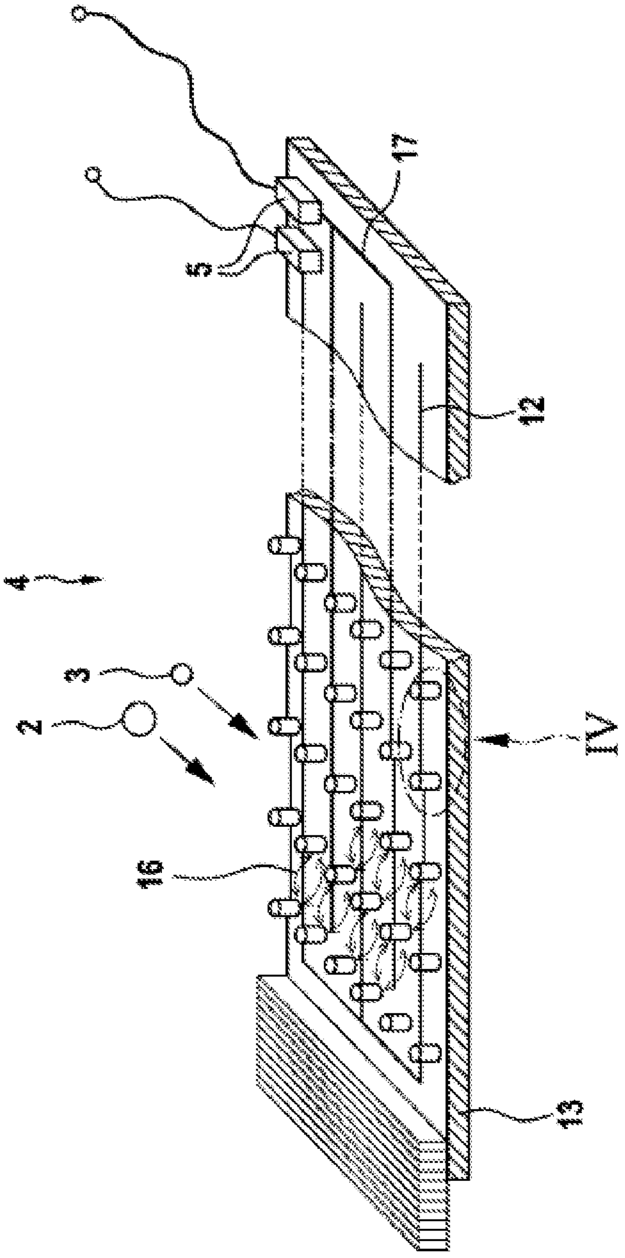
FIG. 4: a further layer for the apparatus proposed here in a perspective view.

FIG. 4 shows, in schematic form, a further layer 4 for an apparatus proposed here in a perspective view. The reference numerals are used uniformly, and so reference may be made in full to the above remarks relating to the preceding figures.

The configuration according to FIG. 4 differs from that according to FIGS. 1 to 3 especially in that the barrier structure 8 here is not an electrode structure but an insulator structure. In this case, instead of the metal posts, insulating spacers (posts) are used as barrier structure 8 with planar metal electrodes 12 applied (on one or both sides). It is particularly advantageous here when (owing to possible crosstalk of fields of adjacent layers 4) exact adjustment is additionally ensured on stacking or winding.

Figure 5:
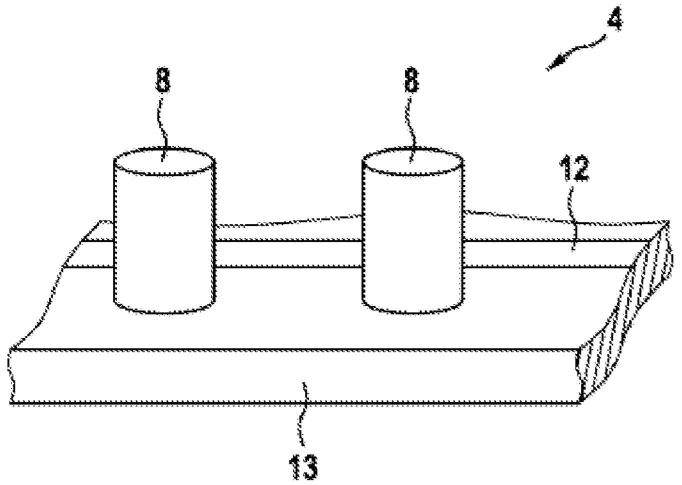
FIG. 5: a detail view of the working example according to FIG. 4, FIG. 6: a sequence of a process proposed here.

FIG. 5 shows, in schematic form, a detailed view of the working example according to FIG. 4. The corresponding detail section is marked by IV in FIG. 4. The reference numerals are used uniformly, and so reference may be made in full to the above remarks relating to the preceding figures.

Figure 6:
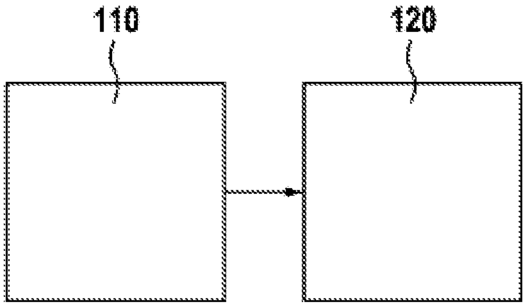

FIG. 6 shows, in schematic form, a sequence of a process proposed here. The process serves for production of an apparatus proposed here. The sequence of process steps shown with blocks 110 and 120 is established in a regular operating sequence. In block 110, one or more of the layers are provided. In block 120, at least one of the layers is coiled or two or more of the layers are stacked.

Figure 7:
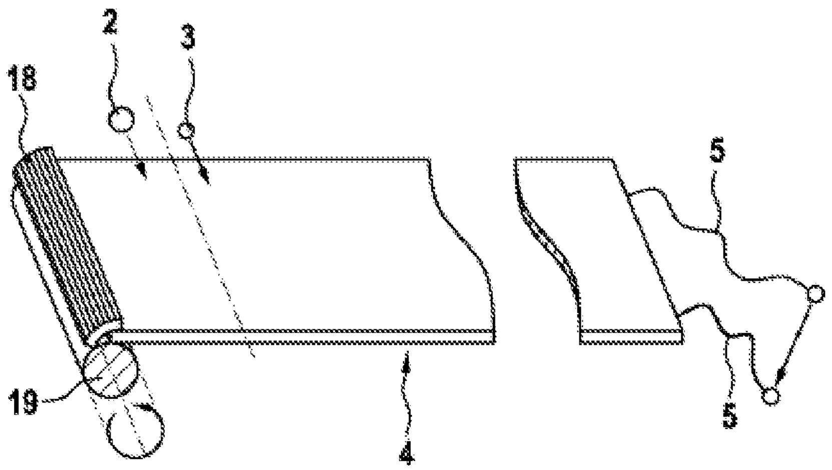
FIG. 7: an illustration of a step of the process proposed here.

FIG. 7 shows, in schematic form, an illustration of a step of the process proposed here. The reference numerals are used uniformly, and so reference may be made in full to the above remarks relating to the preceding figures.

FIG. 7 illustrates, in this connection, provision of a layer 4. The layer 4 is held by way of example by a securing means 18 on a carrier roll 19. The securing means 18, for this purpose, is at the same time formed by way of example in the manner of a spacer.

Figure 8:
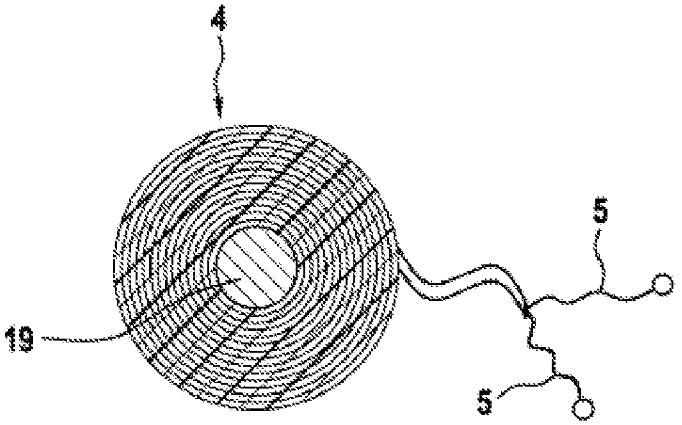
FIG. 8: an illustration of a further step of the process proposed here.

FIG. 8 shows a schematic of an illustration of a further step of the process proposed here. The reference numerals are used uniformly, and so reference may be made in full to the above remarks relating to the preceding figures.

FIG. 8, in this connection, illustrates coiling of the layer 4 provided in FIG. 7. In this case, by way of example, a layer 4 (suitably a structured film arrangement) is wound onto a carrier roll 19 and electrically contacted at the end. The effective flow cross-sectional area of such a "coiled DEP cylinder" can be calculated from the outer areas of the rolled-up strip and of the carrier present therein, and varies according to the layout. The diameter of the carrier 19 may be minimized in favor of a maximum throughput. Such a cylinder would be integratable without any great difficulty into a likewise cylindrical channel (cf. FIG. 9).

Figure 9:
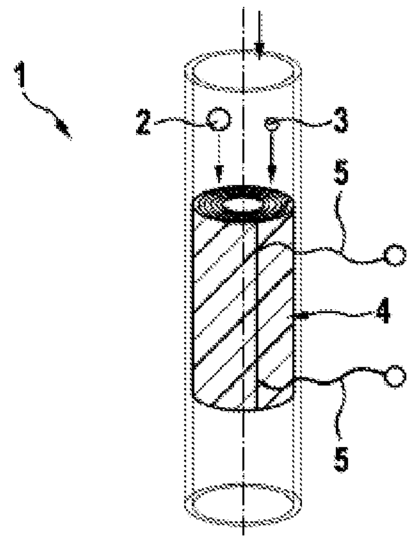
FIG. 9: a further apparatus proposed here in a perspective view.

FIG. 9 shows, in schematic form, a further apparatus 1 proposed here in a perspective view. The reference numerals are used uniformly, and so reference may be made in full to the above remarks relating to the preceding figures.

The apparatus 1 could have been produced, for example, by the process steps illustrated in FIG. 7 and FIG. 8. What this means more particularly, in other words, is that the apparatus 1 as illustrated in FIG. 9 takes the form of a "coiled cylinder".

The advantages of this embodiment are to be discussed hereinafter with reference to a calculation example for a coiled cylinder:

A layer 4 (DEP strip), for example according to FIG. 1, of thickness 100 μm (substrate thickness 50 μm and post height 50 μm, at a ratio of post width to post separation of 1:1) and length of approximately 1 m, could be rolled up through 35 windings on a roll 19 of diameter 6 mm to form a cylinder having a total diameter of less than 13 mm. The length of such a coiled cylinder could be chosen individually (e.g. 1 cm). A 10 ml blood sample could then likewise be processed within approximately one hour at a maximum flow rate of 100 μm/s, with the major difference (from the calculation example set out above for a conventional DEP trapping filtration) that such a filter could then be incorporated relatively simply into lab-on-a-chip systems.

Such a filter could be produced by microscale fabrication technology: the insulator strata 13 could be produced with insulator films. The insulator films could be thin, spin-coated polyimide films having a thickness of up to 25 μm, for example. A carrier roll 19 of plastic, for example, could have a bending radius of down to one millimeter or less. The film and roll could be joined to one another by an adhesive tape of suitable height, which could simultaneously also serve as spacer and protection for the posts (barrier structure 8) in a first wrap. A suitable electrode material could be a metal, for example copper or gold, which has been structured and applied (beforehand), for example, by photolithography, sputtering methods and/or electroplating, especially in different heights for conductor tracks 14 and metal posts (of an illustrative barrier structure 8). Conductor tracks 14 here could have thicknesses between a few nanometers up to a few micrometers, and posts of an illustrative barrier structure 8 could have heights of possibly up to 100 μm. For electrical contacting 5 of the layer 4, solder contacts would be conceivable. If the intention were to passivate the metal electrodes electrically with chemically inert material (as an illustrative passivation 10), it would be possible for this purpose to apply aluminum oxide by vapor deposition, for example.

A similar effect would also be achievable by stacking of multiple layers 4 to form a "DEP stack", especially with defined trap cross section.

Figure 10:
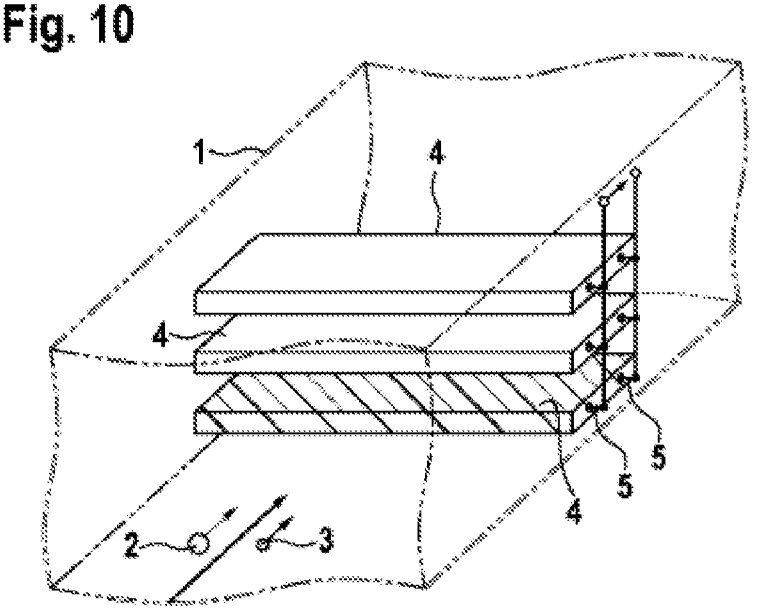
FIG. 10: a further apparatus proposed here in a perspective view.

FIG. 10 shows a schematic of a further apparatus 1 proposed here in a perspective view. The reference numerals are used uniformly, and so reference may be made in full to the above remarks relating to the preceding figures.

FIG. 10 illustrates, by way of example, the aforementioned execution as a "DEP stack". In other words, this relates more particularly to an apparatus 1 in which two or more of the layers 4 are stacked.

It would be possible in principle to produce layers or "DEP strips", as presented above, in any widths and lengths and, as a result, individually to form cylinders and stacks of any diameters, lengths, widths and heights.

The solution proposed here especially has one or more of the following advantages:

High degree of parallelization of individual microfluidic channels with precisely adjustable dimensions and field strengths, which enables efficient exploitation of the dielectrophoretic trap volume: increase in the effective cross-sectional flow area or reduction in the relative flow rate in the fluidic channel in compact form achievable, with particles keeping a maximum distance from the electrodes Various layout options, since a large selection of design parameters is available (particularly with regard to length and width of the DEP strips used, which would be easily adjustable)

Process potentially very inexpensive, since mass production conceivable

Relatively simple in principle, and good integratability into MEMS or microfluidic technologies Optional operation with passivated metal electrodes (possibly on both sides and extruded) achievable in a simple manner: generation of high field strength gradients even at high frequencies with comparatively low operating voltages without bubble formation, for example, resulting from chemical reactions, etc.

The invention claimed is:

1. An apparatus for dielectrophoretic trapping of particles, comprising;

at least one electrical contact;

at least one layer including a first layer having a first top layer side, a first bottom layer side, and a barrier structure, wherein the barrier structure:

is configured such that a fluid comprising the particles flows through the barrier structure, is disposed on the first top layer side, is an electrode structure, and spaces the first top layer side apart from the first bottom layer side of a different portion of the first layer or from a second bottom layer side of a second layer of the at least one layer.

2. The apparatus as claimed in claim 1, wherein the first layer is coiled.

3. The apparatus as claimed in claim 2, wherein the first layer is coiled so as to form a fluid channel between the first top layer side and the first bottom layer side, with the barrier structure disposed in the fluid channel between the first top layer side and the first bottom layer side.

4. The apparatus as claimed in claim 1, wherein the at least one layer comprises two or more stacked layers, which include the first layer and the second layer.

5. The apparatus as claimed in claim 4, wherein the first and second layers are stacked so as to form a fluid channel between the first top layer side and the second bottom layer side of the second layer, with the barrier structure disposed in the fluid channel so as to space the first top layer side of the first layer from the second bottom layer side of the second layer.

6. The apparatus as claimed in claim 1, further comprising:

at least one electrical passivation or electrical insulation disposed on the first top layer side and covering the barrier structure.

7. The apparatus as claimed in claim 6, wherein a part of the at least one electrical passivation or electrical insulation that covers the barrier structure contacts the first bottom layer side of the different portion of the first layer or the second bottom layer side of the second layer.

8. The apparatus as claimed in claim 1, further comprising at least one electrode that extends at least partly over the first layer.

9. The apparatus as claimed in claim 1, wherein the barrier structure includes a plurality of posts formed as rod electrodes projecting from the first top layer side of the first layer.

10. The apparatus as claimed in claim 1, wherein the first layer includes two insulator strata and at least one electrode enclosed between the two insulator strata.

11. The apparatus as claimed in claim 1, wherein the barrier structure extends from the first top layer side to the first bottom layer side of the different portion of the first layer.

12. The apparatus as claimed in claim 1, wherein the barrier structure extends from the first top layer side of the first layer to the second bottom layer side of the second layer.

13. A process for producing an apparatus for dielectrophoretic trapping of particles, comprising:

providing at least one electrical contact;

providing at least one layer including a first layer having a first top layer side, a first bottom layer side, and a barrier structure, wherein the barrier structure:

is configured such that a fluid comprising the particles can flow through the barrier structure, is disposed on the first top layer side, is an electrode structure, and spaces the first top layer side apart from the first bottom layer side of a different portion of the first layer or from a second bottom layer side of a second layer of the at least one layer; and coiling the first layer or stacking the first layer and the second layer.

* * * * *